(12) United States Patent
Liu et al.

(10) Patent No.: US 12,408,141 B2
(45) Date of Patent: Sep. 2, 2025

(54) PAGING METHOD AND APPARATUS, DEVICE, AND STORAGE MEDIUM

(71) Applicant: ZTE CORPORATION, Shenzhen (CN)

(72) Inventors: Xu Liu, Shenzhen (CN); Bo Dai, Shenzhen (CN); Xiubin Sha, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 364 days.

(21) Appl. No.: 17/758,466

(22) PCT Filed: Jan. 11, 2021

(86) PCT No.: PCT/CN2021/071023
§ 371 (c)(1),
(2) Date: Jul. 7, 2022

(87) PCT Pub. No.: WO2021/143633
PCT Pub. Date: Jul. 22, 2021

(65) Prior Publication Data
US 2023/0030166 A1 Feb. 2, 2023

(30) Foreign Application Priority Data
Jan. 17, 2020 (CN) .......................... 202010055670.9

(51) Int. Cl.
*H04W 68/02* (2009.01)
(52) U.S. Cl.
CPC .................................. *H04W 68/02* (2013.01)

(58) Field of Classification Search
CPC ..... H04W 68/02; H04W 76/28; H04W 72/51; H04W 24/08; H04W 64/006; H04W 74/0833; H04W 88/02
See application file for complete search history.

(56) References Cited

U.S. PATENT DOCUMENTS 10,296,451 B1 * 5/2019 Schneider ............... G06F 3/061
2012/0300714 A1 * 11/2012 Ng ....................... H04W 74/0833
370/329
2017/0366236 A1 12/2017 Ryoo et al.
(Continued)

FOREIGN PATENT DOCUMENTS

| CN | 109451847 A | 3/2019 |
|----|-------------|--------|
| CN | 110035482 A | 7/2019 |

(Continued)

OTHER PUBLICATIONS

International Searching Authority. International Search Report and Written Opinion for PCT Application No. PCT/CN2021/071023 and English translation, mailed Mar. 31, 2021, pp. 1-12.
(Continued)

*Primary Examiner* — Ankur Jain
(74) *Attorney, Agent, or Firm* — Vivacqua Crane, PLLC

(57) ABSTRACT

Disclosed are a paging method and apparatus, a device, and a non-transitory computer-readable storage medium. The paging method may include: determining at least one paging characteristic type according to a preset classification policy; and configuring a paging resource for each of the at least one paging characteristic type.

16 Claims, 6 Drawing Sheets

(56) References Cited

U.S. PATENT DOCUMENTS

| | | | | |
|---|---|---|---|---|
| 2018/0092060 A1* | 3/2018 | Won | .................... | H04W 72/51 |
| 2019/0150124 A1* | 5/2019 | Nogami | ................ | H04L 5/0044 |
| | | | | 370/330 |
| 2021/0058893 A1* | 2/2021 | Sha | .................. | H04W 52/0235 |
| 2024/0259996 A1* | 8/2024 | Liang | .................... | H04W 4/16 |

FOREIGN PATENT DOCUMENTS

| | | | | | |
|---|---|---|---|---|---|
| CN | 110351815 | A | | 10/2019 | |
| CN | 111901866 | A | | 11/2020 | |
| EP | 3806557 | A1 | | 4/2021 | |
| EP | 3965486 | A1 | | 3/2022 | |
| EP | 3500040 | B1 | * | 6/2023 | ............ H04W 48/16 |
| WO | 2018028576 | A1 | | 2/2018 | |
| WO | 2018161244 | A1 | | 9/2018 | |
| WO | 2019192303 | A1 | | 10/2019 | |
| WO | 2019232732 | A1 | | 12/2019 | |

OTHER PUBLICATIONS

European Patent Office. Extended European Search Report for EP Application No. 21741638.7, mailed Jan. 29, 2024, pp. 1-14.
Korean Intellectual Property Office. First Office Action for KR Application No. 10-2022-7020041 and English translation, mailed Jun. 9, 2025, pp. 1-26.

* cited by examiner

PAGING METHOD AND APPARATUS, DEVICE, AND STORAGE MEDIUM

CROSS-REFERENCE TO RELATED APPLICATION

This application is a national stage filing under 35 U. S.C. § 371 of international application number PCT/CN2021/071023, filed on Jan. 11, 2021, which claims priority to Chinese patent application No. 202010055670.9 filed on Jan. 17, 2020. The contents of these applications are incorporated herein by reference in their entirety.

TECHNICAL FIELD

The present disclosure relates to the technical field of radio communication systems, in particular, to a paging method and apparatus, a device, and a non-transitory computer-readable storage medium.

BACKGROUND

Mobile communication technology has entered the era of the 5th Generation Mobile Communication Technology (5G). In an NR system, since paging messages are not initiated at full bandwidth, a control resource set is defined to determine the frequency domain resource range and time domain resource range for paging transmission and monitoring. However, the control resource set configuration allocates the same paging resources for all paging, and thus being difficult to provide precise services and to properly manage the paging resources.

SUMMARY

The present disclosure provides a paging method and apparatus, a device, and a non-transitory computer-readable storage medium.

An embodiment of the present disclosure provides a paging method applied to a first communication node, which may include: determining one or more paging characteristic types according to a preset classification policy; and configuring a corresponding paging resource for each of the paging characteristic types.

An embodiment of the present disclosure provides a paging method applied to a second communication node, which may include: receiving correspondence between paging characteristic types and paging resources that is broadcast by a first communication node; determining a paging characteristic type of a current node; determining a paging resource corresponding to the current node based on the paging characteristic type of the current node; and monitoring a paging message on the paging resource corresponding to the current node.

An embodiment of the present disclosure provides a paging apparatus, which may include: a determination module configured to determine one or more paging characteristic types according to a preset classification policy; and a configuration module configured to configure a corresponding paging resource for each of the paging characteristic types.

An embodiment of the present disclosure provides a paging apparatus, which may include: a receiving module configured to receive correspondence between paging characteristic types and paging resources that is broadcast by a first communication node; a determination module configured to determine a paging characteristic type of a current node, and determine a paging resource corresponding to the current node based on the paging characteristic type of the current node; and a monitoring module configured to monitor a paging message on the paging resource corresponding to the current node.

An embodiment of the present disclosure provides a device, which may include: at least one processor; and a memory configured to store at least one program, where the at least one program, when executed by the at least one processor, causes the at least one processor to implement any of the methods according to the embodiments of the present disclosure.

An embodiment of the present disclosure provides a non-transitory computer-readable storage medium storing a computer program which, when executed by a processor, implements any of the methods according to the embodiments of the present disclosure.

DETAILED DESCRIPTION

The embodiments of the present disclosure will be described below with reference to the accompanying drawings.

The steps shown in the flowcharts of the drawings may be performed in a computer system, such as with a set of computer-executable instructions. Moreover, although a logical order is shown in the flowcharts, the steps shown or described may be performed, in some cases, in a different order from the order shown or described herein.

The technical schemes of the present disclosure may be applied to various communication systems, such as a Global System for Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LIE-A) system, a Universal Mobile Telecommunication System (UMTS), and a 5G system, etc., which are not limited in the embodiments of the present disclosure. In the present disclosure, a 5G system is used as an example for illustration.

Figure 1:
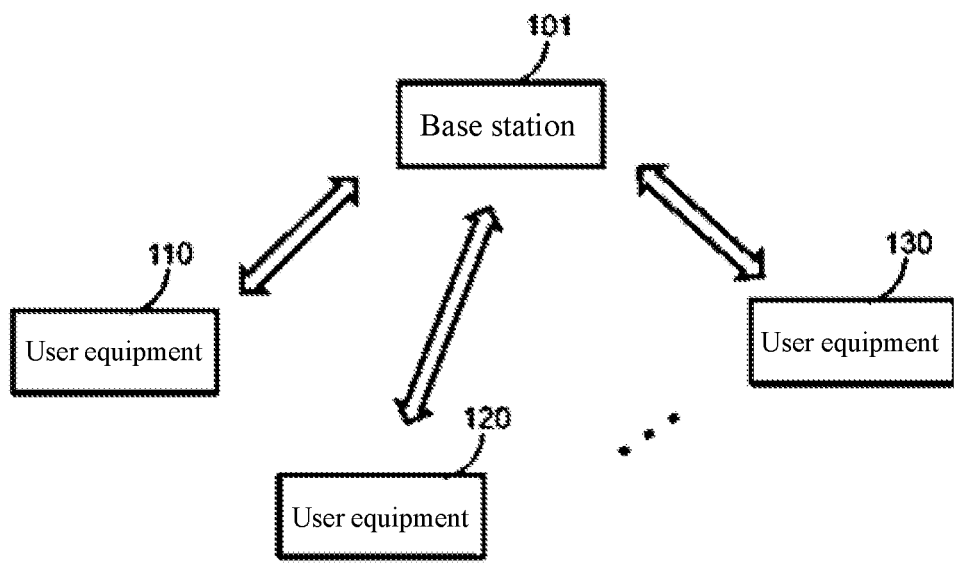
FIG. 1 is a schematic diagram of a radio network system provided by the present disclosure.

Embodiments of the present disclosure may be applied to radio networks of different modes. The radio access networks may include different communication nodes in different systems. FIG. 1 is a schematic diagram of a radio network system provided by the present disclosure. As shown in FIG. 1, the radio network system 100 includes a base station 101, user equipment 110, user equipment 120, and user equipment 130. The base station 101 is in radio communication with the user equipment 110, the user equipment 120, and the user equipment 130, respectively.

In the embodiments of the present disclosure, the base station may be any device capable of communicating with a user terminal. The base station may be any device having a radio transceiver function, including, but not limited to: a NodeB (NB), an evolved NodeB (eNodeB), a base station in a 5G communication system, a base station in a future communication system, an access node in a Wireless Fidelity (WiFi) system, a radio relay node, a radio backhaul node, and the like. The base station may also be a radio controller in a cloud radio access network (C-RAN) scenario. The base station may also be a small station, a Transmission Reference Point (TRP), etc., which is not limited in the embodiments of the present disclosure.

In the embodiments of the present disclosure, the user terminal is a device with radio transceiver functions that can be deployed on land, including indoor or outdoor, handheld, wearable, or vehicle-mounted; on water (e.g., ships, etc.); and in the air (e.g., on aircraft, balloons, satellites, etc.). The user terminal may be a mobile phone, a Pad, a computer with a radio transceiver function, a virtual reality (VR) terminal device, an augmented reality (AR) terminal device, a radio terminal device in industrial control, a radio terminal device in self-driving, a radio terminal device in remote medical, a radio terminal device in smart grid, a radio terminal device in transportation safety, a radio terminal device in smart city, and a radio terminal device in smart home, and the like. The application scenario is not limited in the embodiments of the present disclosure. The user terminal may sometimes be called a terminal device, an access terminal device, a UE unit, a UE station, a mobile radio station, a mobile station, a remote station, a remote terminal device, a mobile device, a UE terminal device, a radio communication device, a UE agent, or a UE apparatus, and the like, which is not limited in the embodiments of the present disclosure.

In the 5G New Radio (NR) radio access system, paging messages between the base station and the user terminal are not sent at full bandwidth. Therefore, a control resource set is introduced, which is used to determine the frequency domain resource range and time domain range for paging transmission and monitoring. In addition, parameters related to paging messages are configured, such as PagingCycle, the number N of paging radio frames in a cycle, the offset of a paging radio frame PF_offset, and the number ns of Paging Occasions (PO) in a paging radio frame.

In addition, in the NR system, up to 32 UE can be paged simultaneously in one paging. However, the control resource set configuration manner configures the same paging resources for all paging, and thus can neither provide precise services nor manage the paging resources better.

Figure 2:
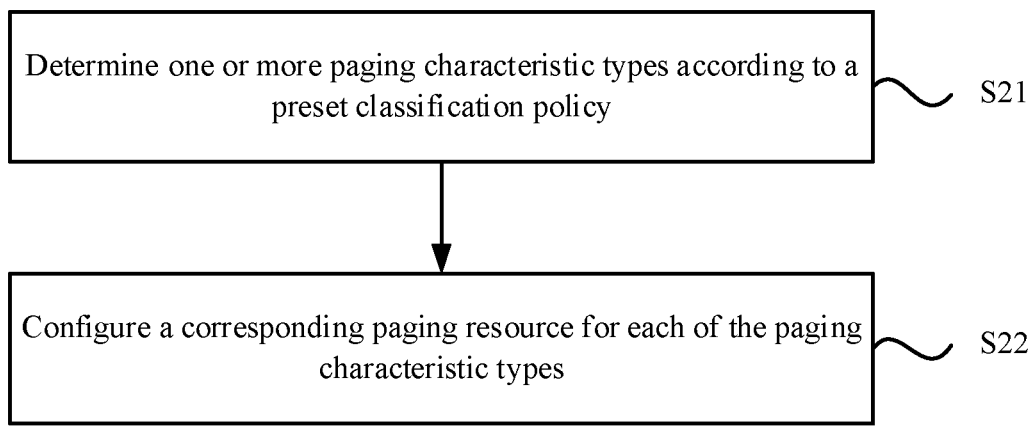
FIG. 2 is a flowchart of a paging method provided by the present disclosure.

FIG. 2 is a flowchart of a paging method provided by the present disclosure. This method may be applied to the case where a base station configures a paging resource for UE. The method may be performed by a paging apparatus provided by the present disclosure, and the paging apparatus may be implemented by software and/or hardware and integrated on a first communication node.

As shown in FIG. 2, the paging method provided by the embodiment of the present disclosure mainly includes steps S21 and S22.

At S21, one or more paging characteristic types are determined according to a preset classification policy.

At S22, a corresponding paging resource is configured for each of the paging characteristic types.

In the embodiments of the present disclosure, the first communication node may be understood as a base station, and the base station may be any of the base stations mentioned above. The second communication node may be understood as user equipment, and the user equipment may be any of the user equipment mentioned above, which is illustrated in the present disclosure embodiment taking a 5G base station as an example.

Communication may be performed between the second communication node and a plurality of first communication nodes.

In this embodiment, based on the paging characteristic type of the user equipment, different paging resources are configured for different paging characteristic types, and the correspondence between paging characteristic types and paging resources is broadcasted.

In an implementation, the paging characteristic type is determined by at least one of the following information: network quality of service, access network type, mobility, coverage type, power consumption, or a category of a second communication node.

The network quality of service includes at least one of the following: data packet, data transmission rate, reliability, maximum bit rate, allocation and retention priority, or packet error rate.

The access network type includes at least one of the following: access to a new radio (NR) network or access to a new radio (NR) low-complexity network.

The mobility includes at least one of the following: stationary, high-speed mobile, or low-speed mobile. The coverage type includes at least one of the following: normal coverage, enhanced coverage, or an enhanced coverage level.

The power consumption includes at least one of the following: low power consumption or high power consumption.

The category of the second communication node includes at least one of the following: NR device, NR low-complexity device, stationary terminal device, high-speed mobile terminal, low-speed mobile terminal, terminal device supporting enhanced coverage, terminal device not supporting enhanced coverage, low-power consumption terminal device, or general-power consumption terminal device.

In an implementation, configuring a corresponding paging resource for each of the paging characteristic types includes one of the following: configuring a corresponding control resource set for each of the paging characteristic types; configuring a corresponding paging occasion for each of the paging characteristic types; configuring a corresponding classification carrier for each of the paging characteristic types; configuring corresponding discontinuous reception (DRX) information for each of the paging characteristic types; or configuring public resources for a plurality of paging characteristic types and configuring a dedicated resource for each of the plurality of paging characteristic types.

In an implementation, configuring a corresponding control resource set for each of the paging characteristic types includes one of the following ways: configuring one or more paging characteristic types for each control resource set on the basis of the control resource set; or configuring one or more control resource sets for each of the paging characteristic types on the basis of a paging characteristic.

In an implementation, in the case of classification according to the network quality of service, or, in the case of classification according to the power consumption, determining one or more paging characteristic types according to a preset classification policy includes one of the following ways: receiving an access stratum (AS) message from a second communication node, where the AS message carries a paging characteristic type of the second communication node; receiving a media access control-control element (MAC-CE) message sent by the second communication node, where the MAC-CE message carries a paging characteristic type of the second communication node; or receiving a paging message sent by a core network, where the paging message carries a paging characteristic type of the second communication node, the paging characteristic type carried in the paging message being sent by the second communication node.

In an implementation, in the case of classification according to the network quality of service, or, in the case of classification according to the power consumption, the paging characteristic type of the second communication node is determined through negotiation between the second communication node and the core network via a non-access stratum (NAS) message.

In an implementation, the paging characteristic type of the second communication node being determined by the second communication node and the core network via a non-access stratum (NAS) message includes one of the following ways: sending, by the second communication node, the paging characteristic type to the core network, and determining, by the core network, the paging characteristic type of the second communication node; or identifying, by the core network, the paging characteristic type of the second communication node and sending the paging characteristic type of the second communication node to the second communication node, and determining the paging characteristic type by the second communication node.

In an implementation, in the case of classification according to the access network type, determining one or more paging characteristic types according to a preset classification policy includes: receiving a paging message sent by a core network, where the paging message carries access network type information of the second communication node; or receiving a paging message sent by a core network, where the paging message does not carry access network type information of the second communication node.

In an implementation, in the case of classification according to the mobility, determining one or more paging characteristic types according to a preset classification policy includes: receiving a paging message sent by a core network, where the paging message carries cell information of a cell for a previous connection of the second communication node, where the cell information of the cell for the previous connection of the second communication node is sent to the core network by the first communication node.

In an implementation, in the case of classification according to the coverage type, determining one or more paging characteristic types according to a preset classification policy includes: receiving a paging message sent by a core network, where the paging message carries coverage type information of the second communication node, where the coverage type information of the second communication node is sent to the core network by the first communication node.

In an implementation, after configuring a corresponding paging resource for each of the paging characteristic types, the method further includes: configuring a corresponding physical random access channel (PRACH) resource for the paging resource for each type, where the PRACH resource is used to instruct the second communication node to initiate random access on the PRACH resource.

In an implementation, the method further includes: broadcasting correspondence between paging characteristic types and paging resources and correspondence between paging resources and PRACH resources.

In an implementation, the method further includes: receiving a paging message sent by a core network, where the paging message carries a paging characteristic type of a second communication node; determining a paging resource corresponding to the second communication node based on the paging characteristic type of the second communication node; and paging the second communication node on the paging resource corresponding to the second communication node.

In an implementation, in the case of classification of the second communication node according to the mobility, paging the second communication node on the paging resource corresponding to the second communication node includes one of the following ways: in response to cell information of a cell for a previous connection of the second communication node belonging to the first communication node, paging the second communication node on a configured paging resource corresponding to this cell; and, in response to cell information of a cell for a previous connection of the second communication node not belonging to the first communication node, paging the second communication node on a configured paging resource corresponding to a cell other than this cell.

In an implementation, in the case of classification of the second communication node according to the access network type, paging the second communication node on the paging resource corresponding to the second communication node includes one of the following ways:

paging the second communication node on an NR network corresponding to the access network type;

paging the second communication node simultaneously on both an NR network and an NR low-complexity network that correspond to the access network type.

In an implementation, the second communication node paged on the NR low-complexity network includes at least one of the following: a second communication node with a reduced number of transceiver antennas; a second communication node with frequency division duplexing (FDD); a second communication node with relaxed processing time; or a second communication node with relaxed processing capability.

In the embodiments of the present disclosure, a control resource set is introduced and different paging resources are configured according to the paging characteristic types, thus realizing the provision of accurate services for each paging-related characteristic while allowing better management of resources; moreover, a larger paging capacity can be provided, thus meeting the demand for simultaneous paging and access of a large number of terminal devices.

Figure 3:
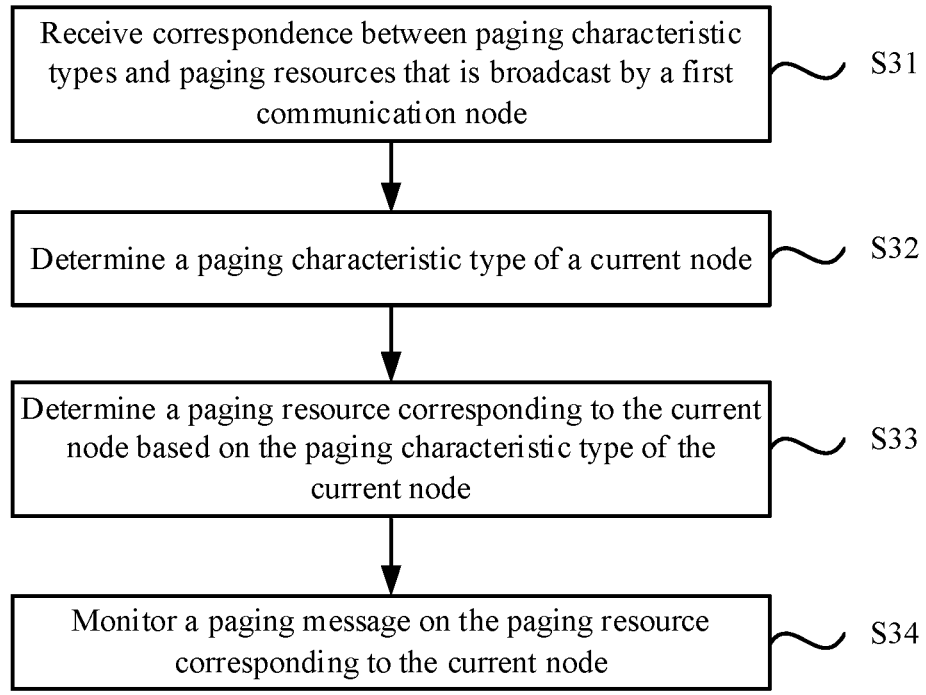
FIG. 3 is a flowchart of a paging method provided by the present disclosure.

FIG. 3 is a flowchart of a paging method provided by the present disclosure. The method may be applied to the case where UE monitors a paging message based on a paging resource configured by a base station. The method may be performed by a paging apparatus provided by the present disclosure, and the paging apparatus may be implemented by software and/or hardware and integrated on a second communication node.

As shown in FIG. 3, the paging method provided by the embodiment of the present disclosure mainly includes steps S31, S32, S33, and S34.

At S31, correspondence between paging characteristic types and paging resources that is broadcast by a first communication node is received.

At S32, a paging characteristic type of a current node is determined.

At S33, a paging resource corresponding to the current node is determined based on the paging characteristic type of the current node.

At S34, a paging message is monitored on the paging resource corresponding to the current node.

In an implementation, the paging characteristic type of the current node is determined by the current node and the core network via a non-access stratum (NAS) message.

In an implementation, the paging characteristic type of the current node being determined by the current node and the core network via a NAS message includes one of the following ways: sending, by a current node, the paging characteristic type to the core network, and determining, by the core network, the paging characteristic type of the current node; or identifying, by the core network, the paging characteristic type of the current node and sending the paging characteristic type of the current node to the current node, and determining the paging characteristic type by the current node.

In an implementation, the paging characteristic type of the current node is determined by the current node and the core network via an access stratum (AS) message.

In an implementation, the paging characteristic type of the current node being determined by the current node and the core network via an access stratum (AS) message includes one of the following ways: receiving an access stratum (AS) message sent by a second communication node, where the AS message carries a paging characteristic type of the second communication node; or receiving a media access control-control element (MAC-CE) message sent by the second communication node, where the MAC-CE message carries a paging characteristic type of the second communication node.

In an implementation, the method further includes: receiving correspondence between paging resources and PRACH resources that is broadcast by a first communication node; and determining a PRACH resource corresponding to the current node based on the paging resource determined by the current node and the correspondence between paging resources and PRACH resources.

In an implementation, the method further includes: in response to a paging message being detected during the monitoring on the paging resource corresponding to the current node, initiating a random access on the PRACH resource corresponding to the current node.

In an applicative example, there is provided a classification method for a paging-related characteristic of an NR system or a subsequent system.

Classification may be performed according to the network quality of service (QoS). The network quality of service includes at least one of the following: data packet, maximum bit rate, allocation and retention priority, or packet error rate.

For example: classification based on the packet size results in categories such as large data packet, small data packet, etc. For another example, classification based on the data transmission rate results in categories such as high transmission rate, low transmission rate, etc. For yet another example, classification based on the reliability results in categories such as high reliability, low reliability, etc.

Classification may be performed according to the access network type for the terminal device. The access network type includes at least one of the following: access to a new radio (NR) network or access to a new radio (NR) low-complexity network.

For example, the classification may result in categories such as terminal device accessing an NR network, terminal device accessing an NR low-complexity network, etc.

Classification may be performed according to the terminal device mobility, where the mobility includes at least one of the following: stationary, high-speed mobile, or low-speed mobile.

For example, classification based on the terminal device mobility may result in categories such as terminal device in a current cell, terminal device in a cell other than the current cell, etc.

Classification may be performed according to the coverage type, where the coverage type includes at least one of the following: normal coverage, enhanced coverage, or an enhanced coverage level.

For example, classification according to the coverage type may result in categories such as normal coverage, enhanced coverage, etc.

For enhanced coverage, the classification is performed according to different coverage levels. A configuration method for a paging resource under such classification contains the following information in addition to the paging resource configuration content of other classifications: configuring a corresponding paging carrier based on the coverage type, such as according to normal coverage and enhanced coverage; and according to different coverage levels, configuring the corresponding paging carrier, and configuring the corresponding number of repetitions of PDCCH paging.

Classification may be performed according to the power consumption, where the power consumption includes at least one of the following: low power consumption or high power consumption.

For example, classification according to power consumption may result in categories such as low power consumption, high power consumption, etc.

The above classification method for paging-related characteristics may be used for NR systems or subsequent systems, e.g., to configure a paging control resource set for each paging characteristic type, where the control resource set is a segment/portion of frequency band bandwidth of the 200 M NR system bandwidth that is used for the physical downlink control channel (PDCCH).

In an applicative example, there is provided a classification method for paging-related characteristics of a narrow band-Internet of Things (NB_IOT) system.

Classification may be performed according to the network quality of service (QoS). The network quality of service includes at least one of the following: data packet, maximum bit rate, allocation and retention priority, or packet error rate.

For example: classification based on the packet size results in categories such as large data packet, small data packet, etc. For another example, classification based on the data transmission rate results in categories such as high transmission rate, low transmission rate, etc. For yet another example, classification based on the reliability results in categories such as high reliability, low reliability, etc.

Classification may be performed according to the terminal device mobility, where the mobility includes at least one of the following: stationary, high-speed mobile, or low-speed mobile.

For example, classification based on the terminal device mobility may result in categories such as terminal device in a current cell, terminal device in a cell other than the current cell, etc.

Classification may be performed according to the coverage type, where the coverage type includes at least one of the following: normal coverage, enhanced coverage, or an enhanced coverage level.

For example, classification according to the coverage type may result in categories such as normal coverage, enhanced coverage, etc.

For enhanced coverage, the classification is performed according to different coverage levels. A configuration method for a paging resource under such classification contains the following information in addition to the paging resource configuration content of other classifications: configuring a corresponding paging carrier based on the coverage type, such as according to normal coverage and enhanced coverage; and according to different coverage levels, configuring the corresponding paging carrier, and configuring the corresponding number of repetitions of PDCCH paging.

Classification may be performed according to the power consumption, where the power consumption includes at least one of the following: low power consumption or high power consumption.

For example, classification according to power consumption may result in categories such as low power consumption, high power consumption, etc.

The above classification method for paging-related characteristics may be used in the NB_IOT system to configure a paging resource for each paging characteristic type, that is, configuring one or more paging carriers correspondingly for each paging characteristic type.

In an applicative example, there is provided a classification method for paging-related characteristics of an enhanced Machine Type Communications (eMTC) system.

Classification may be performed according to the network quality of service (QoS). The network quality of service includes at least one of the following: data packet, maximum bit rate, allocation and retention priority, or packet error rate.

For example: classification based on the packet size results in categories such as large data packet, small data packet, etc. For another example, classification based on the data transmission rate results in categories such as high transmission rate, low transmission rate, etc. For yet another example, classification based on the reliability results in categories such as high reliability, low reliability, etc.

Classification may be performed according to the terminal device mobility, where the mobility includes at least one of the following: stationary, high-speed mobile, or low-speed mobile.

For example, classification based on the terminal device mobility may result in categories such as terminal device in a current cell, terminal device in a cell other than the current cell, etc.

Classification may be performed according to the coverage type, where the coverage type includes at least one of the following: normal coverage, enhanced coverage, or an enhanced coverage level.

For example, classification according to the coverage type may result in categories such as normal coverage, enhanced coverage, etc.

For enhanced coverage, the classification is performed according to different coverage levels. A configuration method for a paging resource under such classification contains the following information in addition to the paging resource configuration content of other classifications: configuring a corresponding paging carrier based on the coverage type, such as according to normal coverage and enhanced coverage; and according to different coverage levels, configuring the corresponding paging carrier, and configuring the corresponding number of repetitions of PDCCH paging.

Classification may be performed according to the power consumption, where the power consumption includes at least one of the following: low power consumption or high power consumption.

For example, classification according to power consumption may result in categories such as low power consumption, high power consumption, etc.

The above classification method for paging-related characteristics may be used in the eMTC system to configure a corresponding paging narrow band for each paging characteristic type, that is, configuring one or more paging narrow bands correspondingly for each paging characteristic type.

In an applicative example, there is provided a rule for mapping paging resources to corresponding paging characteristic types when the base station is configured with multiple paging characteristic types.

A first correspondence rule: each paging characteristic type is independently mapped to a corresponding paging resource.

Table 1 shows the mapping between paging characteristic types and paging resources according to an embodiment of the present disclosure. As shown in Table 1, the base station is configured with two paging characteristic classification ways: classification based on the mobility and classification based on the coverage type. For example, in the case where the paging characteristic type is stationary terminal device, the corresponding paging resource has index #0. In the case where the paging characteristic type is terminal device supporting enhanced coverage, the corresponding paging resource has index #3.

TABLE 1

| Paging characteristic type | Paging resource index |
| --- | --- |
| Stationary terminal device | Paging resource index #0 |
| High-speed mobile terminal | Paging resource index #1 |
| Low-speed mobile terminal | Paging resource index #2 |
| Terminal device supporting enhanced coverage | Paging resource index #3 |
| Terminal device not supporting enhanced coverage | Paging resource index #4 |

A second correspondence rule: paging characteristics are superimposed for classification and are mapped to corresponding paging resources.

Table 2 shows the mapping between paging characteristic types and paging resources according to an embodiment of the present disclosure. As shown in Table 2, the base station is configured with two paging characteristic classification ways: classification based on the mobility and classification based on the coverage type. For example, in the case where the paging characteristic type is stationary terminal device and terminal device supporting enhanced coverage, the corresponding paging resource has index #0. In the case where the paging characteristic type is high-speed mobile terminal and terminal device not supporting enhanced coverage, the corresponding paging resource has index #3.

TABLE 2

| Paging characteristic type | Paging resource index |
| --- | --- |
| Stationary terminal device and terminal device supporting enhanced coverage | Paging resource index #0 |
| Stationary terminal device and terminal device not supporting enhanced coverage | Paging resource index #1 |
| High-speed mobile terminal and terminal device supporting enhanced coverage | Paging resource index #2 |
| High-speed mobile terminal and terminal device not supporting enhanced coverage | Paging resource index #3 |
| Low-speed mobile terminal and terminal device supporting enhanced coverage | Paging resource index #4 |
| Low-speed mobile terminal and terminal device not supporting enhanced coverage | Paging resource index #5 |

In an applicative example, there is provided a method for determining a paging characteristic type through negotiation.

For a method of classification according to the usage of a terminal device, the terminal device side and the base station side need to share the same understanding of the paging characteristic type of the terminal device, then the category of the terminal device has to be determined first through negotiation between the terminal device and the network side. The network side may be understood as the core network Access and Mobility Management Function (AMF).

The UE and the AMF determine the paging characteristic type of the UE through negotiation using NAS messages. The NAS message includes at least: a registration request message.

There are two main ways for the UE and the AMF to determine the paging characteristic type of the UE through negotiation.

Figure 4:
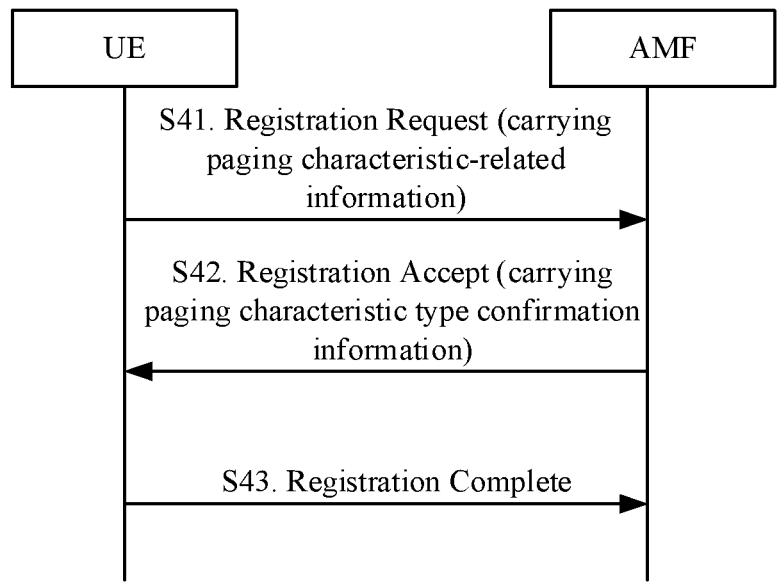
FIG. 4 is a flowchart of a method for negotiating a paging characteristic type provided by an embodiment of the present disclosure.

In the first way, the UE informs the AMF of the paging characteristic type, and then the AMF confirms it. FIG. 4 is a flowchart of a method for negotiating a paging characteristic type provided by an embodiment of the present disclosure. As shown in FIG. 4, the method for negotiating a paging characteristic type mainly includes steps S41, S42, and S43.

At S41, the UE sends a registration request message to the AMF, where the registration request message carries paging characteristic-related information.

At S42, the AMF sends a registration accept message to the UE, where the registration accept message carries paging characteristic type confirmation information.

At S43, the UE sends a registration complete message to the AMF.

Figure 5:
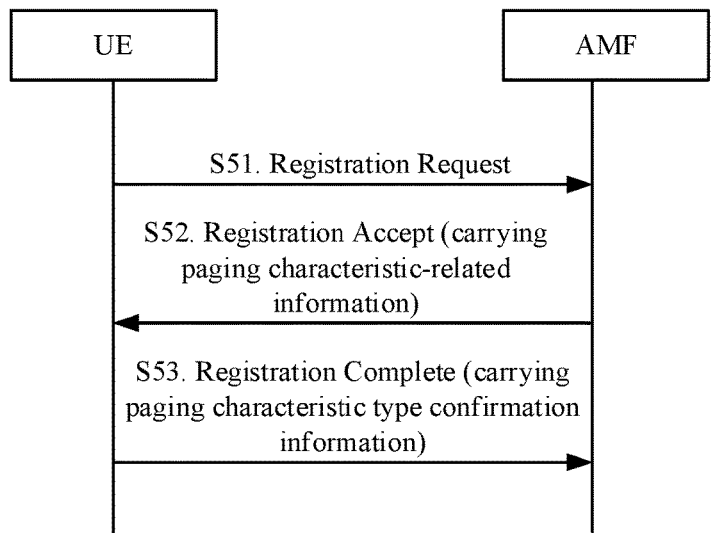
FIG. 5 is a flowchart of a method for negotiating a paging characteristic type provided by an embodiment of the present disclosure.

In the second way, the AMF identifies the paging characteristic type of the UE and notifies the UE, and then the UE confirms it. FIG. 5 is a flowchart of a method for negotiating a paging characteristic type provided by an embodiment of the present disclosure. As shown in FIG. 5, the method for negotiating a paging characteristic type mainly includes steps S51, S52, and S53.

At S51, the UE sends a registration request message to the AMF.

At S52, the AMF sends a registration accept message to the UE, where the registration request message carries paging characteristic-related information.

At S53, the UE sends a registration complete message to the AMF, where the registration complete message carries paging characteristic type confirmation information.

The form of the content negotiated between the UE and the AMF consists of the following two forms.

For the first form, if the paging characteristic type is predefined in the system, the predefined form refers to defining a corresponding paging characteristic index for each paging characteristic type. Table 3 is a table of correspondence between paging characteristic types and paging characteristic indexes provided in an embodiment of the present disclosure. As shown in Table 3, the paging characteristic type corresponding to paging characteristic index 0 is large data packet. The paging characteristic type corresponding to the paging characteristic index 1 is small data packet. Table 3 is only an exemplary illustration of the correspondence between paging characteristic types and paging characteristic indexes, instead of a limitation.

TABLE 3

| Paging characteristic index | Paging characteristic type |
| --- | --- |
| 0 | Large data packet |
| 1 | Small data packet |

In this case, the UE and the AMF may negotiate either the content of the paging characteristic type or the paging-related characteristic index directly. The base station broadcasts configuration information corresponding to each paging characteristic index.

For the second form, the UE and the AMF negotiate the paging-related characteristic type, in which case the base station needs to broadcast configuration information corresponding to each paging characteristic type.

In an applicative example, An embodiment of the present disclosure provides a method for paging UE by a base station. The base station configures a paging resource via System Information Broadcast (SIB) based on the paging characteristic type of the UE. A paging characteristic type of the UE is delivered to the base station and/or the core network via AS signaling, and then subsequent paging is performed based on the paging resource of that paging characteristic type of the UE.

Figure 6:
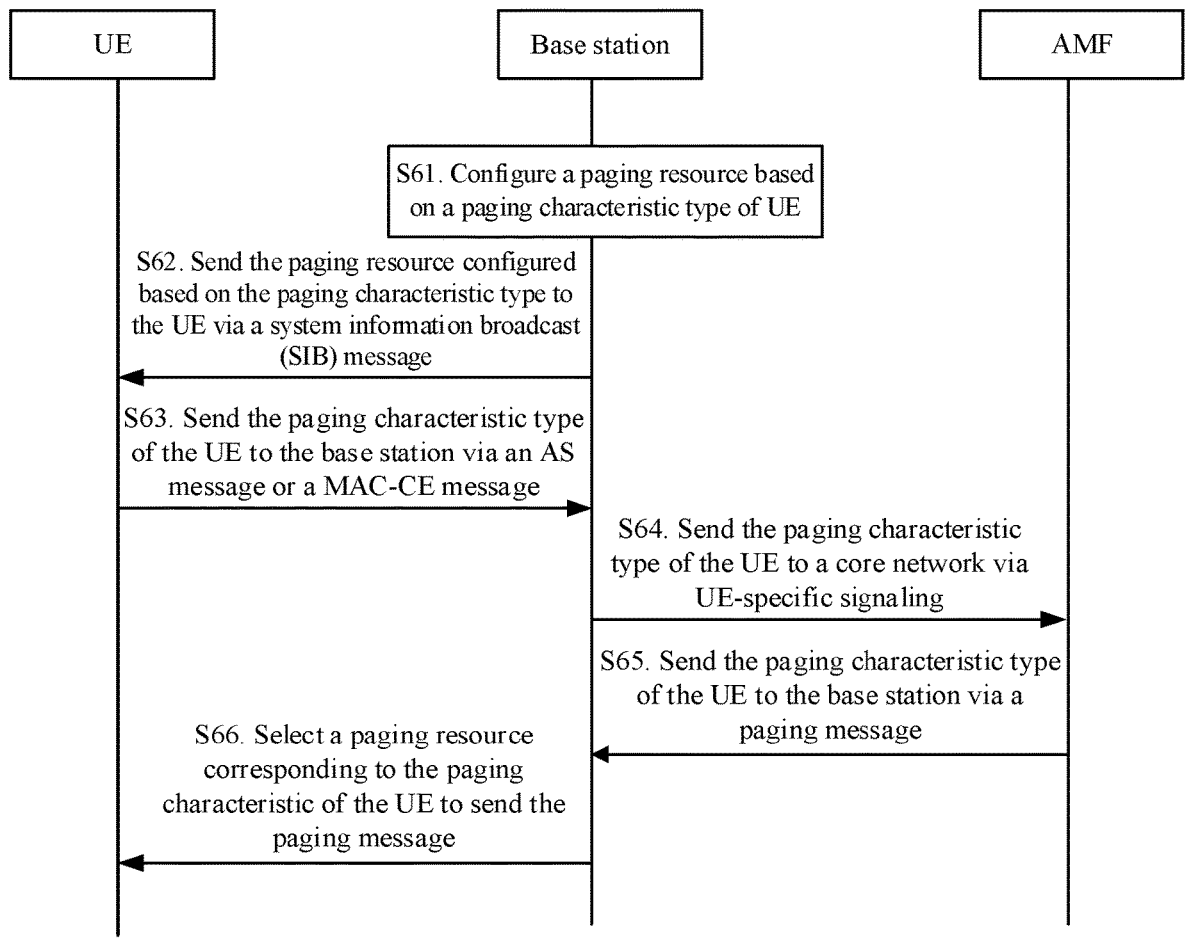
FIG. 6 is a flowchart of a paging method provided by an embodiment of the present disclosure.

FIG. 6 is a flowchart of a paging method provided by an embodiment of the present disclosure. As shown in FIG. 6, the paging method provided by the embodiment of the present disclosure mainly includes the following steps.

At S61, a base station configures a paging resource based on a paging characteristic type of UE.

The paging resource includes at least one of the following: configuring different paging drxCycle for UE with different paging characteristics, configuring different maximum numbers of repetitions of PDCCH paging for UE with different paging characteristics, configuring different Wake up Service (WUS) resources for UE with different paging characteristics, or configuring different carrier resources for UE with different paging characteristics.

For example: WUS resources are specifically allocated for stationary UE, larger paging drxCycle is specifically allocated for delay-insensitive UE, a smaller maximum number of repetitions of physical downlink control channels (PDCCH) paging is specifically allocated for UE with low paging reliability requirements, and a smaller maximum number of repetitions of PDCCH paging is specifically allocated for UE with lower power level (lower maximum uplink transmission power).

At S62, the base station sends the paging resource configured based on the paging characteristic type to the UE via a system information broadcast (SIB) message.

At S63, the UE sends the paging characteristic type of the UE to the base station via an AS message or a MAC-CE message.

The AS message may be: UE Downlink Capability Information, or other uplink radio resource control (RRC) messages, where the UE Capability Information carries the UE-RadioPagingInfo information element.

The paging characteristic includes at least one of the following: an indication of the power level of the UE, an indication of low-power level UE, an indication of low paging reliability requirement of the UE (a paging monitoring relaxation indication), an indication of stationary UE, an indication of slow-moving UE, a movement trajectory of the UE (a historical cell range), a movement direction and movement speed of the UE, or a type of service carried by the UE.

At S64, the base station sends the paging characteristic type (e.g., UE-RadioPagingInfo information element) of the UE to the core network via UE-specific signaling.

At S65, the core network sends the paging characteristic type of the UE to the base station via a Paging message.

The paging characteristic type of the UE carried in the Paging message sent by the core network to the base station may be carried by a UE Radio Capability for Paging information element (where a UE Radio Paging Information message included therein contains a UE-RadioPagingInfo information element) in the Paging message.

The base station may also store the paging characteristic type of the UE. In the case where the base station stores the paging characteristic type of the UE, S64 and S65 may be omitted.

At S66, based on the matching of the paging characteristic-related information of the UE and the paging-related resource configured by the base station based on a paging characteristic of the UE, the base station selects a paging resource corresponding to the paging characteristic of the UE to send the paging message.

Based on the matching of the paging characteristic type of the UE and the paging resource configured by the base station based on the paging characteristic type of the UE, the UE selects a paging resource corresponding to the paging characteristic of the UE to monitor the paging message.

For example: stationary UE selects a WUS resource configured for the stationary UE; delay-insensitive UE selects a large paging drxCycle configured specifically for the delay-insensitive UE, and UE with low paging reliability requirements selects a small maximum number of repetitions of PDCCH paging configured specifically for the UE with low paging reliability requirements.

The determination of whether the UE is stationary or not may also be performed by determining whether a cell where the UE is currently paged is the same as a cell where it was during the release or suspension of a last RRC connection.

Figure 7:
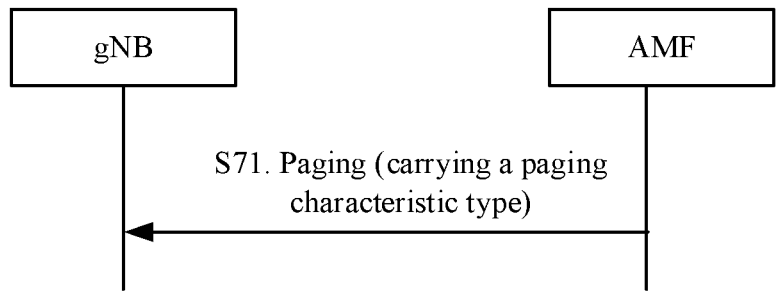
FIG. 7 is a flowchart of a method for acquiring a paging characteristic type of user equipment (UE) by a next-generation NodeB (gNB) provided by an embodiment of the present disclosure.

In an applicative example, a further embodiment of the present disclosure provides a method for acquiring a paging characteristic type of UE by a gNB. FIG. 7 is a flowchart of a method for acquiring a paging characteristic type of UE by a gNB provided by an embodiment of the present disclosure. As shown in FIG. 7, the method for acquiring a paging characteristic type of UE by a gNB provided by the embodiment of the present disclosure mainly includes the following steps:

At S71, when paging the UE, an AMF sends a paging message to the gNB, where the paging message carries a paging characteristic type of the UE.

The paging characteristic type of the UE contains: classification according to the network quality of service (QoS). The network quality of service includes at least one of the following: data packet, maximum bit rate, allocation and retention priority, or packet error rate.

For example: classification based on the packet size results in categories such as large data packet, small data packet, etc. For another example, classification based on the data transmission rate results in categories such as high transmission rate, low transmission rate, etc. For yet another example, classification based on the reliability results in categories such as high reliability, low reliability, etc.

Classification may be performed according to the access network type for the terminal device. The access network type includes at least one of the following: access to a new radio (NR) network or access to a new radio (NR) low-complexity network.

For example, the classification may result in categories such as terminal device accessing an NR network, terminal device accessing an NR low-complexity network, etc.

The form may be an indication of a type or information carrying the UE ID value a terminal device of that type, for example, an NR UE Identity Index value, or an NR Light UE Identity Index value.

Classification may be performed according to the terminal device mobility, where the mobility includes at least one of the following: stationary, high-speed mobile, or low-speed mobile.

For example, classification based on the terminal device mobility may result in categories such as terminal device in a current cell, terminal device in a cell other than the current cell, etc. The cell identifier (ID) information is carried in a paging message issued from the core network.

Classification may be performed according to the coverage type, where the coverage type includes at least one of the following: normal coverage, enhanced coverage, or an enhanced coverage level.

For example, classification according to the coverage type may result in categories such as normal coverage, enhanced coverage, etc.

For enhanced coverage, the classification is performed according to different coverage levels. A configuration method for a paging resource under such classification contains the following information in addition to the paging resource configuration content of other classifications: configuring a corresponding paging carrier based on the coverage type, such as according to normal coverage and enhanced coverage; and according to different coverage levels, configuring the corresponding paging carrier, and configuring the corresponding number of repetitions of PDCCH paging.

Classification may be performed according to the power consumption, where the power consumption includes at least one of the following: low power consumption or high power consumption.

For example, classification according to power consumption may result in categories such as low power consumption, high power consumption, etc.

Based on paging control resource set information configured for each paging characteristic type and the paging characteristic type carried by the AMF, the base station determines the paging control resource set to be used for paging the terminal device.

Based on the paging control resource set information configured for each paging characteristic type that is broadcast by the base station in a system message and the paging characteristic type determined by the terminal device through negotiation, the terminal device determines a paging control resource set for monitoring a paging message.

In addition, a further embodiment of the present disclosure provides a method for acquiring a paging characteristic type in a cell by a gNB. The AMF may also bring the paging characteristic type in the cell to the gNB via public signaling (e.g., NG Setup Response, RAN Configuration Update Acknowledge, AMF Configuration Update) of the Next Generation (NG) interface.

Figure 8:
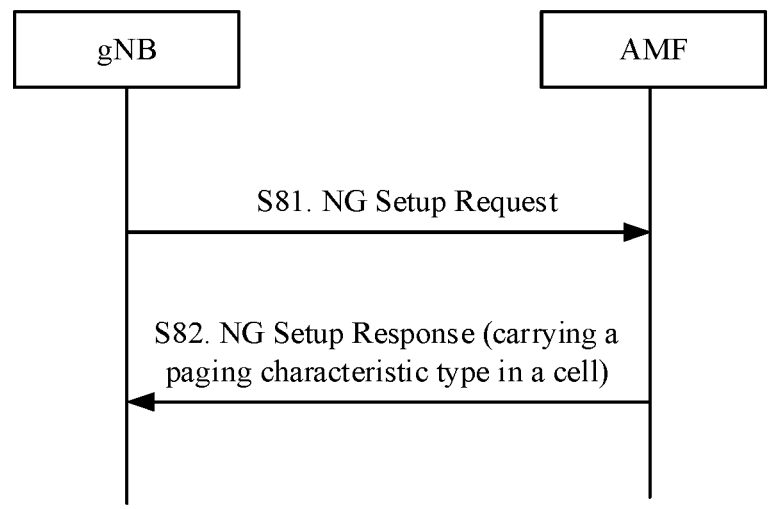
FIG. 8 is a flowchart of a method for acquiring a paging characteristic type in a cell by a gNB provided by an embodiment of the present disclosure.

FIG. 8 is a flowchart of a method for acquiring a paging characteristic type in a cell by a gNB provided by an embodiment of the present disclosure. As shown in FIG. 8, the method for acquiring a paging characteristic type in a cell by a gNB provided by the embodiment of the present disclosure mainly includes the following steps.

At S81, a gNB sends an NG Setup Request message to an AMF.

At S82, the AMF sends an NG Setup Response, where the NG Setup Response message carries the paging characteristic type in the cell.

On this basis, the gNB configures a corresponding paging resource for each paging characteristic type in the cell, such as one or more paging control resource sets for one or more paging categories, or one or more paging categories for one or more paging control resource sets.

Figure 9:
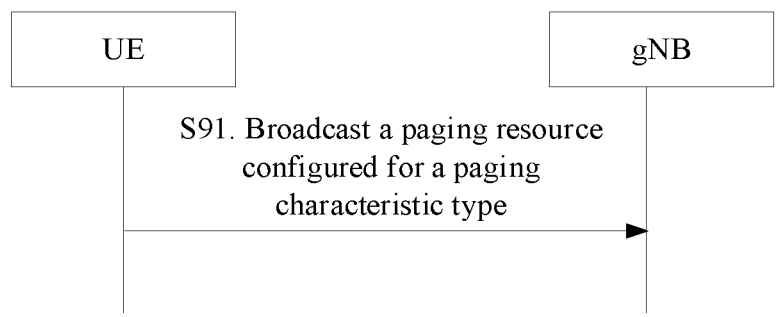
FIG. 9 is a flowchart of a method for broadcasting a configuration message by a gNB provided by an embodiment of the present disclosure.

FIG. 9 is a flowchart of a method for broadcasting a configuration message by a gNB provided by an embodiment of the present disclosure. As shown in FIG. 9, the method for broadcasting a configuration message by a gNB provided by an embodiment of the present disclosure mainly includes the following step:

At S91, a gNB broadcasts a paging resource configured for a paging characteristic type to UE.

In an applicative example, classification is performed according to the terminal device mobility, in which case a terminal device in this cell is a terminal device that still resides in a cell where a previous connection was released, while a terminal device in a cell other than this cell is a terminal device that has moved out of the cell where the previous connection was released and resides in another cell.

When the connection is released, the base station informs the core network of the cell ID information of the cell to which the terminal device is connected.

In subsequent paging, the core network carries in a paging message the cell ID information of the cell for the previous connection of the terminal device.

In the case of classification according to the mobility, the base station informs the network side of the cell ID information of the cell to which the UE is connected in the UE Context Release Complete message at the time of connection release.

Figure 10:
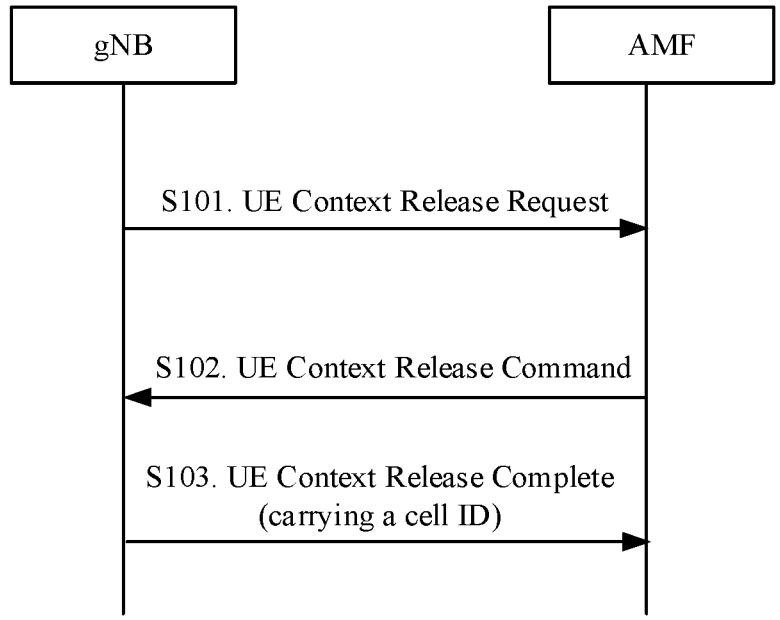
FIG. 10 is a flowchart of the interaction between a base station and an AMF during connection release provided by an embodiment of the present disclosure.

FIG. 10 is a flowchart of the interaction between a base station and an AMF during connection release provided by an embodiment of the present disclosure. As shown in FIG. 10, the interaction process between the base station and the AMF during connection release provided by the embodiment of the present disclosure mainly includes the following steps.

At S101, a gNB sends a UE Context Release Request message to an AMF.

At S102, the AMF sends a UE Context Release Command message to the gNB.

At S103, the gNB sends a UE Context Release Complete message to the AMF, where the UE Context Release Complete message carries a cell ID.

In the case of classification according to the mobility, the core network needs to carry cell ID information when sending the paging message. If the cell ID belongs to the base station, then the base station will page the UE on a configured paging resource for a terminal device in this cell; otherwise, it will page the UE on a configured paging resource for a terminal device in a cell other than this cell.

Figure 11:
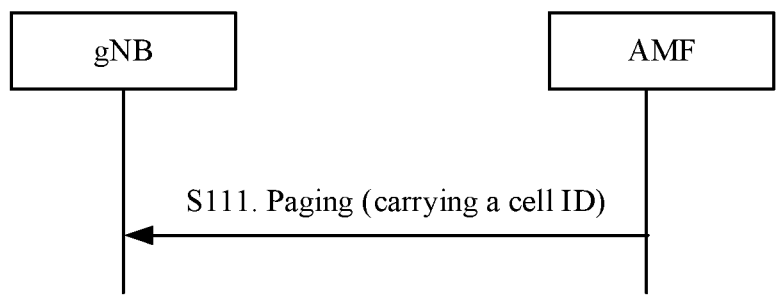
FIG. 11 is a flowchart of a method for acquiring a paging characteristic type by a base station provided by an embodiment of the present disclosure.

FIG. 11 is a flowchart of a method for acquiring a paging characteristic type by a base station provided by an embodiment of the present disclosure. As shown in FIG. 11, the method for acquiring a paging characteristic type by a base station provided by an embodiment of the present disclosure mainly includes the following step:

At S111, an AMF sends a paging message to a gNB, where the paging message carries a cell ID.

In an applicative example, this embodiment provides a configuration method for a paging resource based on a paging characteristic type.

A new control resource set is configured, including the following configuration manners: configuring a corresponding control resource set for each paging characteristic type, i.e., configuring a corresponding control resource set for each paging characteristic type in a list of paging-related characteristics; and configuring a control resource set for a new terminal device supporting the division of paging characteristic types.

Configuring a corresponding control resource set for each paging characteristic type, i.e., configuring a corresponding control resource set for each paging characteristic type in a list of paging-related characteristics includes one of the following ways.

In a first way, one or more paging characteristic types are configured for each control resource set in a list of control resource sets using the control resource sets as the basis for configuration; each control resource set is configured with the same paging parameters (e.g., paging cycle, ns, . . . ); and each control resource set may be configured with different paging parameters (e.g., paging cycle, ns, . . . ).

In a second way, one or more control resource sets are configured for each paging characteristic type in the list of paging-related characteristics using the paging characteristic types as the basis for configuration; each control resource set is configured with the same paging parameters (paging cycle, ns, . . . ); and each control resource set may be configured with different paging parameters (paging cycle, ns, . . . ).

Configuring a control resource set for a new terminal device supporting the division of paging characteristic types includes: configuring the new control resource set with the same paging parameters (paging cycle, ns, . . . ) as the original control resource set; and configuring the new control resource set with different paging parameters (paging cycle, ns, . . . ) from the original control resource set.

Figure 12:
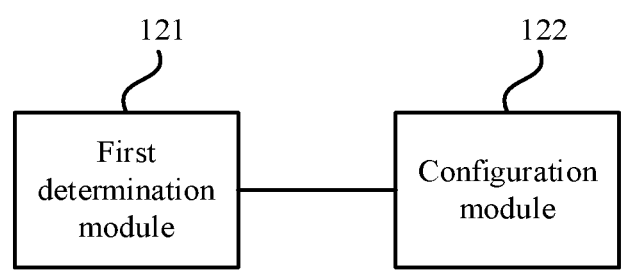
FIG. 12 is a schematic diagram of a paging apparatus provided by the present disclosure.

FIG. 12 is a schematic diagram of a paging apparatus provided by the present disclosure. This method may be applied to the case where a base station configures a paging resource for UE. This paging apparatus may be implemented by software and/or hardware and integrated on the first communication node.

As shown in FIG. 12, the paging apparatus provided by the embodiment of the present disclosure mainly includes a first determination module 121 and a configuration module 122.

The determination module 121 is configured to determine one or more paging characteristic types according to a preset classification policy; and the configuration module 122 is configured to configure a corresponding paging resource for each of the paging characteristic types.

In an implementation, the paging characteristic type is determined by at least one of the following information: network quality of service, access network type, mobility, coverage type, power consumption, or a category of a second communication node.

The network quality of service includes at least one of the following: data packet, data transmission rate, reliability, maximum bit rate, allocation and retention priority, or packet error rate. The access network type includes at least one of the following: access to a new radio (NR) network or access to a new radio (NR) low-complexity network. The mobility includes at least one of the following: stationary, high-speed mobile, or low-speed mobile. The coverage type includes at least one of the following: normal coverage, enhanced coverage, or an enhanced coverage level. The power consumption includes at least one of the following: low power consumption or high power consumption.

The category of the second communication node includes at least one of the following: NR device, NR low-complexity device, stationary terminal device, high-speed mobile terminal, low-speed mobile terminal, terminal device supporting enhanced coverage, terminal device not supporting enhanced coverage, low-power consumption terminal device, or general-power consumption terminal device.

In an implementation, the configuration module 122 is configured to perform one of the following operations: configuring a corresponding control resource set for each of the paging characteristic types; configuring a corresponding paging occasion for each of the paging characteristic types; configuring a corresponding classification carrier for each of the paging characteristic types; configuring corresponding DRX information for each of the paging characteristic types; or configuring public resources for a plurality of paging characteristic types and configuring a dedicated resource for each of the plurality of paging characteristic types.

In an implementation, the configuration module 122 is configured to perform one of the following operations: configuring one or more paging characteristic types for each control resource set on the basis of the control resource set; or configuring one or more control resource sets for each of the paging characteristic types on the basis of a paging characteristic.

In an implementation, the first determination module 121 is configured to, in the case of classification according to the network quality of service, or, in the case of classification according to the power consumption, perform one of the following operations: receiving an access stratum (AS) message sent by a second communication node, where the AS message carries a paging characteristic type of the second communication node; receiving a media access control-control element (MAC-CE) message sent by the second communication node, where the MAC-CE message carries a paging characteristic type of the second communication node; or receiving a paging message sent by a core network, where the paging message carries a paging characteristic type of the second communication node, the paging characteristic type carried in the paging message being sent by the second communication node.

In an implementation, in the case of classification according to the network quality of service, or, in the case of classification according to the power consumption, the paging characteristic type of the second communication node is determined through negotiation between the second communication node and the core network via a non-access stratum (NAS) message.

In an implementation, the paging characteristic type of the second communication node being determined by the second communication node and the core network via a non-access stratum (NAS) message includes one of the following ways: sending, by the second communication node, the paging characteristic type to the core network, and determining, by the core network, the paging characteristic type of the second communication node; or identifying, by the core network, the paging characteristic type of the second communication node and sending the paging characteristic type of the second communication node to the second communication node, and determining the paging characteristic type by the second communication node.

In an implementation, the first determination module 121 is configured to, in the case of classification according to the access network type, perform one of the following operations: receiving a paging message sent by a core network, where the paging message carries access network type information of the second communication node; or receiving a paging message sent by a core network, where the paging message does not carry access network type information of the second communication node.

In an implementation, the first determination module 121 is configured to, in the case of classification according to the mobility, determine one or more paging characteristic types according to a preset classification policy, and receive a paging message sent by the core network, where the paging message carries cell information of a cell for a previous connection of the second communication node, where the cell information of the cell for the previous connection of the second communication node is sent to the core network by the first communication node.

In an implementation, the first determination module 121 is configured to, in the case of classification according to the coverage type, receive the paging message sent by the core network, where the paging message carries coverage type information of the second communication node, where the coverage type information of the second communication node is sent to the core network by the first communication node.

In an implementation, the configuration module 122 is further configured to configure a corresponding physical random access channel (PRACH) resource for the paging resource for each type, where the PRACH resource is used to instruct the second communication node to initiate random access on the PRACH resource.

In an implementation, the apparatus further includes: a broadcasting module configured to broadcast correspondence between paging characteristic types and paging resources and correspondence between paging resources and PRACH resources.

In an implementation, the apparatus further includes: a receiving module configured to receive a paging message sent by a core network, where the paging message carries a paging characteristic type of a second communication node; a first determination module 121 configured to determine a paging resource corresponding to the second communication node based on the paging characteristic type of the second communication node; and a paging module configured to page the second communication node on the paging resource corresponding to the second communication node.

In an implementation, the paging module is configured to, in the case of classification of the second communication node according to the mobility, perform one of the following operations: in response to cell information of a cell for a previous connection of the second communication node belonging to the first communication node, paging the second communication node via a configured paging resource corresponding to this cell; or in response to cell information of a cell for a previous connection of the second communication node not belonging to the first communication node, paging the second communication node via a configured paging resource corresponding to a cell other than this cell.

In an implementation, the paging module is configured to, in the case of classification of the second communication node according to the access network type, perform one of the following operations:

paging the second communication node on an NR network corresponding to the access network type;
paging the second communication node simultaneously on both an NR network and an NR low-complexity network that correspond to the access network type.

In an implementation, the second communication node paged on the NR low-complexity network includes at least one of the following: a second communication node with a reduced number of transceiver antennas; a second communication node with half-duplex FDD; a second communication node with relaxed processing time; or a second communication node with relaxed processing capability.

In the embodiments of the present disclosure, a control resource set is introduced and different paging resources are configured according to the paging characteristic types, thus realizing the provision of accurate services for each paging-related characteristic while allowing better management of resources; moreover, a larger paging capacity can be provided, thus meeting the demand for simultaneous paging and access of a large number of terminal devices.

The paging apparatus provided in this embodiment can perform the paging method provided in any of the embodiments of the present disclosure, and has the corresponding functional modules and beneficial effects for performing the method. For technical details not described in detail in this embodiment, reference may be made to the paging method provided in any of the embodiments of the present disclosure.

In the above embodiment of the paging apparatus, the units and modules included are divided only according to functional logic, but are not limited to the above division, as long as the corresponding functions can be achieved. In addition, the names of the functional units are only for the convenience of distinguishment, and are not used to limit the scope of protection of the present disclosure.

Figure 13:
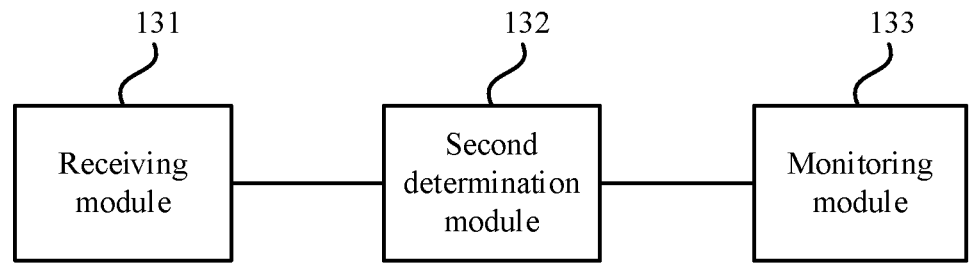
FIG. 13 is a schematic diagram of a paging apparatus provided by the present disclosure.

FIG. 13 is a schematic diagram of a paging apparatus provided by the present disclosure. The method may be applied to the case where UE monitors a paging message based on a paging resource configured by a base station. This paging apparatus can be implemented by software and/or hardware and integrated on the second communication node.

As shown in FIG. 13, the paging apparatus provided by the embodiment of the present disclosure mainly includes a receiving module 131, a second determination module 132, and a monitoring module 133.

The receiving module 131 is configured to receive correspondence configuration information of paging characteristic types and paging resources that is broadcast by a first communication node; the second determination module 132 is configured to determine a paging characteristic type of a current node; and determine a paging resource corresponding to the current node based on the paging characteristic type of the current node; and the monitoring module 134 is configured to monitor a paging message on the paging resource corresponding to the current node.

In an implementation, the paging characteristic type of the current node is determined by the current node and the core network via a non-access stratum (NAS) message.

In an implementation, the paging characteristic type of the current node being determined by the current node and the core network via a NAS message includes one of the following ways: sending, by a current node, the paging characteristic type to the core network, and determining, by the core network, the paging characteristic type of the current node; or identifying, by the core network, the paging characteristic type of the current node and sending the paging characteristic type of the current node to the current node, and determining the paging characteristic type by the current node.

In an implementation, the paging characteristic type of the current node is determined by the current node and the core network via an access stratum (AS) message.

In an implementation, the paging characteristic type of the current node being determined by the current node and the core network via an access stratum (AS) message includes one of the following ways: receiving an access stratum (AS) message sent by a second communication node, where the AS message carries a paging characteristic type of the second communication node; or receiving a media access control-control element (MAC-CE) message sent by the second communication node, where the MAC-CE message carries a paging characteristic type of the second communication node.

In an implementation, the receiving module 131 is configured to receive correspondence between paging resources and PRACH resources that is broadcast by the first communication node; and a PRACH resource determination module is configured to determine a PRACH resource corresponding to the current node based on the paging resource determined by the current node and the correspondence between paging resources and PRACH resources.

In an implementation, the apparatus further includes an access module configured to, in response to a paging message being detected during the monitoring on the paging resource corresponding to the current node, initiate a random access on the PRACH resource corresponding to the current node.

The paging apparatus provided in this embodiment can perform the paging method provided in any of the embodiments of the present disclosure, and has the corresponding functional modules and beneficial effects for performing the method. For technical details not described in detail in this embodiment, reference may be made to the paging method provided in any of the embodiments of the present disclosure.

In the above embodiment of the paging apparatus, the units and modules included are divided only according to functional logic, but are not limited to the above division, as long as the corresponding functions can be achieved. In addition, the names of the functional units are only for the convenience of distinguishment, and are not used to limit the scope of protection of the present disclosure.

Figure 14:
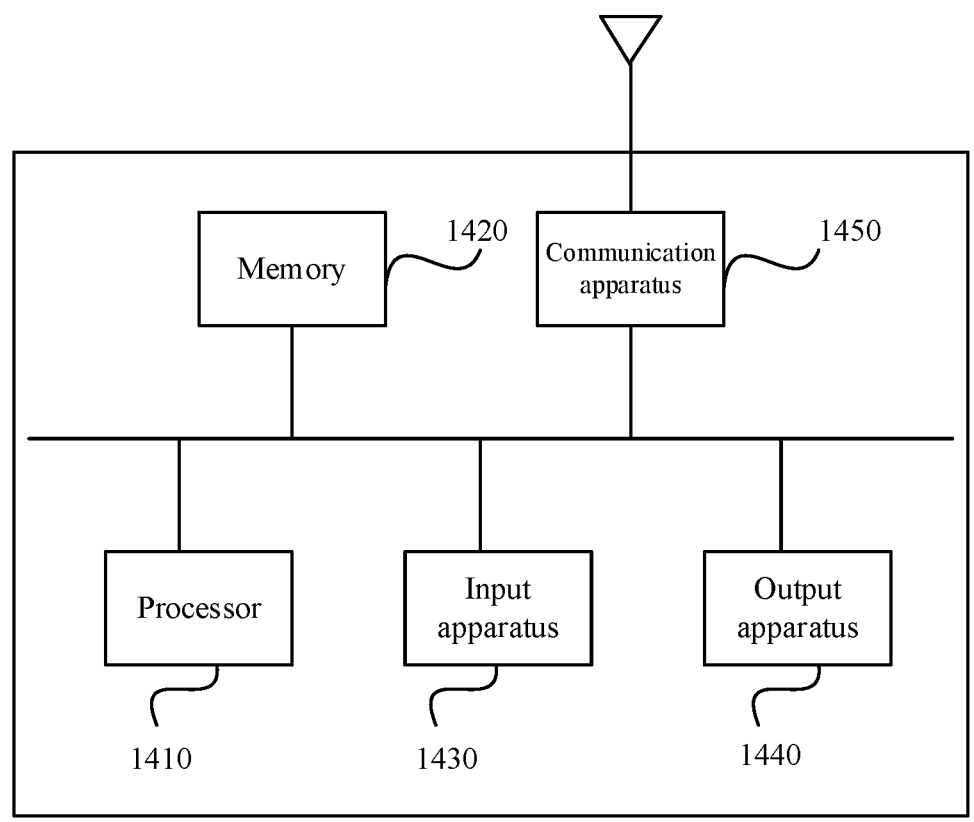
FIG. 14 is a schematic diagram of a device provided by an embodiment of the present disclosure.

FIG. 14 is a schematic diagram of a device provided by an embodiment of the present disclosure. As shown in FIG. 14, the device includes a processor 1410, a memory 1420, an input apparatus 1430, and an output apparatus 1440. There may be one or more processors 1410 in the device, and one processor 1410 is shown as an example in FIG. 14. The processor 1410, the memory 1420, the input apparatus 1430, and the output apparatus 1440 in the device can be connected by a bus or in other ways. In FIG. 14, the connection is realized by a bus as an example.

The memory 1420, as a computer-readable storage medium, may be used to store software programs, computer-executable programs, and modules, such as program instructions/modules (e.g., the first determination module 121 and the configuration module 122 in the paging apparatus) corresponding to the paging method in the embodiments of the present disclosure, and program instructions/modules (e.g., the receiving module 131, the second determination module 132, and the monitoring module 133 in the paging apparatus) corresponding to the paging method in the embodiments of the present disclosure. The processor 1410 executes various functional applications of the device as well as data processing by running the software programs, instructions, and modules stored in the memory 1420, i.e., to implement any of the methods provided in the embodiments of present disclosure.

The memory 1420 may mainly include a storage program area and a storage data area, where the storage program area may store an operating system and application program(s) required by at least one function, and the storage data area may store data created according to the use of a device, etc. In addition, the memory 1420 may include a high-speed random access memory and a non-volatile memory, for example, at least one magnetic disk storage device, a flash memory device, or another non-volatile solid-state storage device. In some examples, the memory 1420 may include memories remotely located with respect to the processor 1410, and these remote memories may be connected to devices via a network. Examples of the above-mentioned network include the Internet, an intranet, a local area network, a mobile communication network, and a combination thereof.

The input apparatus 1430 may be configured to receive an input numerical digit or character information and generate a key signal input related to user settings and function control of the device. The output apparatus 1440 may include a display device such as a display screen.

The communications apparatus 1450 may include a receiver and a transmitter. The communications apparatus 1450 is configured to transmit and receive information according to control of the processor 1410.

When the executing device in this embodiment is the first communication node, the processor 1410 executes various functional applications as well as data processing by running the programs stored in the system memory 1420, such as implementing the paging method provided in the embodiments of the present disclosure, the method including: determining one or more paging characteristic types according to a preset classification policy; and configuring a corresponding paging resource for each of the paging characteristic types.

The processor 1410 may also implement the technical scheme of the paging method provided in any embodiment of the present disclosure. The hardware structure as well as the functionality of this device may be found explained in the contents of the embodiment.

When the executing device in this embodiment is the second communication node, the processor 1410 executes various functional applications as well as data processing by running the programs stored in the system memory 1420, such as implementing the paging method provided in the embodiments of the present disclosure, the method including: receiving correspondence between paging characteristic types and paging resources that is broadcast by a first communication node; determining a paging characteristic type of a current node; determining a paging resource corresponding to the current node based on the paging characteristic type of the current node; and monitoring a paging message on the paging resource corresponding to the current node.

The processor 1410 may also implement the technical scheme of the paging method provided in any embodiment of the present disclosure. The hardware structure as well as the functionality of this device may be found explained in the contents of the embodiment.

A further embodiment of the present disclosure provides a storage medium containing computer-executable instructions which, when executed by a computer processor, execute a paging method, the method including: determining one or more paging characteristic types according to a preset classification policy; and configuring a corresponding paging resource for each of the paging characteristic types.

An embodiment of the present disclosure provides a storage medium including computer-executable instructions, where the computer-executable instructions are not limited to the method operations as described above, but may also perform the relevant operations in the paging method provided by any embodiment of the present disclosure.

A further embodiment of the present disclosure provides a storage medium containing computer-executable instructions which, when executed by a computer processor, execute a paging method, the method including: receiving correspondence between paging characteristic types and paging resources that is broadcast by a first communication node; determining a paging characteristic type of a current node; determining a paging resource corresponding to the current node based on the paging characteristic type of the current node; and monitoring a paging message on the paging resource corresponding to the current node.

An embodiment of the present disclosure provides a storage medium including computer-executable instructions, where the computer-executable instructions are not limited to the method operations as described above, but may also perform the relevant operations in the paging method provided by any embodiment of the present disclosure.

Through the description of the above embodiments, the present disclosure may be implemented by means of software and necessary general-purpose hardware, and may alternatively be implemented by hardware. The technical schemes of the present disclosure may be embodied substantially in the form of software products, which may be stored in a computer-readable storage medium (such as a floppy disk, read-only memory (ROM), random access memory (RAM), flash, hard disk and optical disk) and include instructions to cause a computing device (such as a personal computer, a server, or a network device) to perform the methods of the embodiments of the present disclosure.

The term "second communication node" covers any suitable type of radio user equipment, such as mobile phones, portable data processing equipment, portable web browsers or vehicle-mounted mobile stations.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example, but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A paging method applied to a first communication node, comprising:
   determining at least one paging characteristic type according to a preset classification policy;
   configuring a paging resource for each of the at least one paging characteristic type;
   after configuring a paging resource for each of the at least one paging characteristic type, the method further comprising:
   configuring a corresponding physical random access channel (PRACH) resource for each type of paging resource, wherein the PRACH resource is used to instruct the second communication node to initiate random access on the PRACH resource; and
   broadcasting correspondence between paging characteristic types and paging resources and correspondence between paging resources and PRACH resources;
   wherein configuring the paging resource for each of the at least one paging characteristic type comprises configuring a control resource set for each paging characteristic type, and configuring the control resource set for each paging characteristic type comprises configuring at least one control resource set for each paging characteristic type on the basis of a paging characteristic.

2. The method of claim 1, wherein:
   the paging characteristic type is determined by at least one of the following information:
      network quality of service, access network type, mobility, coverage type, power consumption, or a category of a second communication node;
      the network quality of service comprises at least one of the following: data packet, data transmission rate, reliability, maximum bit rate, allocation and retention priority, or packet error rate;
      the access network type comprises at least one of the following: access to a new radio (NR) network or access to an NR low-complexity network;
      the mobility comprises at least one of the following: stationary, high-speed mobile, or low-speed mobile;
      the coverage type comprises at least one of the following: normal coverage, enhanced coverage, or an enhanced coverage level;
      the power consumption comprises at least one of the following: low power consumption or high power consumption; and
      the category of the second communication node comprises at least one of the following: NR device, NR low-complexity device, stationary terminal device, high-speed mobile terminal, low-speed mobile terminal, terminal device supporting enhanced coverage, terminal device not supporting enhanced coverage, low-power consumption terminal device, or general-power consumption terminal device.

3. The method of claim 2, wherein in the case of classification according to the access network type, determining at least one paging characteristic type according to a preset classification policy comprises one of:
   receiving a paging message sent by a core network, wherein the paging message carries access network type information of the second communication node; or
   receiving a paging message sent by a core network, wherein the paging message does not carry access network type information of the second communication node.

4. The method of claim 2, wherein in the case of classification according to the mobility, determining at least one paging characteristic type according to a preset classification policy comprises:
   receiving a paging message sent by a core network, wherein the paging message carries cell information of a cell for a previous connection of the second communication node, the cell information of the cell for the previous connection of the second communication node being sent to the core network by a communication node to which the cell information belongs.

5. The method of claim 2, wherein in the case of classification according to the coverage type, determining at least one paging characteristic type according to a preset classification policy comprises:
   receiving a paging message sent by a core network, wherein the paging message carries coverage type information of the second communication node, the coverage type information of the second communication node being sent to the core network by the first communication node.

6. The method of claim 2, further comprising:
   receiving a paging message sent by a core network, wherein the paging message carries a paging characteristic type of a second communication node;

determining a paging resource corresponding to the second communication node based on the paging characteristic type of the second communication node; and paging the second communication node on the paging resource corresponding to the second communication node.

7. The method of claim 6, wherein in the case of classification of the second communication node according to the mobility, paging the second communication node on the paging resource corresponding to the second communication node comprises one of:

in response to cell information of a cell for a previous connection of the second communication node belonging to the first communication node, paging the second communication node on a configured paging resource corresponding to said cell; or in response to cell information of a cell for a previous connection of the second communication node not belonging to the first communication node, paging the second communication node on a configured paging resource corresponding to a cell other than said cell.

8. The method of claim 1, wherein determining at least one paging characteristic type according to a preset classification policy comprises one of:

receiving an access stratum (AS) message sent by a second communication node, wherein the AS message carries a paging characteristic type of the second communication node;

receiving a media access control-control element (MAC-CE) message sent by a second communication node, wherein the MAC-CE message carries a paging characteristic type of the second communication node; or receiving a paging message sent by a core network, wherein the paging message carries a paging characteristic type of the second communication node, the paging characteristic type carried in the paging message being sent by the second communication node.

9. The method of claim 8, wherein in the case of receiving the paging message sent by the core network, the paging characteristic type of the second communication node is determined through negotiation between the second communication node and the core network via a non-access stratum (NAS) message.

10. The method of claim 9, wherein the paging characteristic type of the second communication node being determined by the second communication node and the core network via a NAS message comprises one of:

sending, by the second communication node, the paging characteristic type to the core network, and determining, by the core network, the paging characteristic type of the second communication node; or identifying, by the core network, the paging characteristic type of the second communication node and sending the paging characteristic type of the second communication node to the second communication node, and determining the paging characteristic type by the second communication node.

11. A paging method applied to a second communication node, comprising:

receiving correspondence configuration information of paging characteristic types and paging resources which is broadcast by a first communication node;

determining a paging characteristic type of the second communication node;

determining a paging resource corresponding to the second communication node based on the paging characteristic type of the second communication node and the correspondence configuration information; and monitoring a paging message on the paging resource corresponding to the second communication node;

receiving correspondence configuration information of paging resources and physical random access channel (PRACH) resources which is broadcast by the first communication node; and determining a PRACH resource corresponding to the second communication node based on the paging resource corresponding to the second communication node and the correspondence configuration information of paging resources and PRACH resources;

wherein configuring the paging resource for each of the at least one paging characteristic type comprises configuring a control resource set for each paging characteristic type, and configuring the control resource set for each paging characteristic type comprises configuring at least one control resource set for each paging characteristic type on the basis of a paging characteristic.

12. The method of claim 11, wherein the paging characteristic type of the second communication node is determined by the second communication node and a core network via a non-access stratum (NAS) message.

13. The method of claim 12, wherein the paging characteristic type of the second communication node being determined by the second communication node and a core network via a NAS message comprises one of:

sending, by the second communication node, the paging characteristic type to the core network, and determining, by the core network, the paging characteristic type of the second communication node; or identifying, by the core network, the paging characteristic type of the second communication node and sending the paging characteristic type of the second communication node to the second communication node, and determining the paging characteristic type by the second communication node.

14. A device, comprising:

at least one processor; and a memory configured to store at least one program, wherein the at least one program, when executed by the at least one processor, causes the at least one processor to implement the paging method of claim 1.

15. A non-transitory computer-readable storage medium storing a computer program which, when executed by a processor, implements the paging method of claim 1.

16. A device, comprising:

at least one processor; and a memory configured to store at least one program, wherein the at least one program, when executed by the at least one processor, causes the at least one processor to implement the paging method of claim 11.

* * * * *